(12) United States Patent
Bolen et al.

(10) Patent No.: US 8,214,541 B2
(45) Date of Patent: Jul. 3, 2012

(54) METHOD AND SYSTEM FOR UNIQUELY IDENTIFYING PERIPHERAL COMPONENT DEVICES

(75) Inventors: Austin P. Bolen, Austin, TX (US); Samer El Haj Mahmoud, Austin, TX (US); Madhusudhan Rangarajan, Round Rock, TX (US); Aravind Hariramasamy, Hillsboro, OR (US)

(73) Assignee: Dell Products L.P., Round Rock, TX (US)

( * ) Notice: Subject to any disclaimer, the term of this patent is extended or adjusted under 35 U.S.C. 154(b) by 1409 days.

(21) Appl. No.: 11/422,771

(22) Filed: Jun. 7, 2006

(65) Prior Publication Data

US 2008/0005372 A1  Jan. 3, 2008

(51) Int. Cl.
*G06F 3/00* (2006.01)
*G06F 1/26* (2006.01)

(52) U.S. Cl. ............................................. 710/8; 726/34

(58) Field of Classification Search ......... 710/8; 726/34
See application file for complete search history.

(56) References Cited

U.S. PATENT DOCUMENTS

| | | | |
|---|---|---|---|
| 5,274,816 A | 12/1993 | Oka | 396/700 |
| 5,448,741 A | 9/1995 | Oka | 395/700 |
| 5,577,219 A | 11/1996 | Timko et al. | 395/411 |
| 5,761,448 A | 6/1998 | Adamson et al. | 710/104 |
| 5,802,363 A * | 9/1998 | Williams et al. | 713/2 |
| 5,822,582 A | 10/1998 | Doragh et al. | 395/652 |
| 5,854,905 A | 12/1998 | Garney | 395/284 |
| 5,860,001 A | 1/1999 | Cromer et al. | 395/651 |
| 5,870,554 A | 2/1999 | Grossman et al. | 395/200.52 |
| 6,041,395 A | 3/2000 | Beelitz | 711/173 |
| 6,154,836 A * | 11/2000 | Dawson et al. | 713/1 |
| 6,189,063 B1 | 2/2001 | Rekeita et al. | 710/311 |
| 6,397,268 B1 | 5/2002 | Cepulis | 710/8 |
| 6,446,139 B1 | 9/2002 | Leung et al. | 710/1 |
| 6,513,076 B1 | 1/2003 | Chen et al. | 710/10 |
| 6,519,671 B1 | 2/2003 | Kondou et al. | 710/311 |
| 6,587,959 B1 | 7/2003 | Sjolander et al. | 714/4 |
| 6,678,771 B1 | 1/2004 | Tsai et al. | 710/111 |
| 6,708,283 B1 | 3/2004 | Nelvin et al. | 714/5 |
| 6,721,883 B1 | 4/2004 | Bollian et al. | 713/2 |
| 6,928,498 B2 | 8/2005 | Eichler, Jr. et al. | 710/104 |
| 6,990,685 B1 * | 1/2006 | Christensen et al. | 726/34 |
| 2002/0103995 A1 | 8/2002 | Owen et al. | 713/1 |
| 2004/0168004 A1 | 8/2004 | Mudusuru | 710/104 |
| 2004/0225772 A1 | 11/2004 | Eichler, Jr. et al. | 710/200 |
| 2005/0108515 A1 * | 5/2005 | Rangarajan et al. | 713/2 |
| 2006/0282652 A1 | 12/2006 | El-Haj-mahmoud et al. | 713/1 |

OTHER PUBLICATIONS

Search Report for Singapore Patent Application No. 200703950-6 (6 pages), Nov. 21, 2007.
Response to Written Opinion for Singapore Patent Application No. 200703950-6, 8 pages, Dec. 16, 2008.
Response to Office Action, with Claim Amendments, for United Kingdom Patent Application No. 0710777.4; 18 pages, Jan. 8, 2009.
Singapore Search and Examination Report; Application No. 200703950-6; pp. 9, Apr. 1, 2009.
Office Action from Germany. Patent Application No. DE 10 2007 026 105.7, 8 pages, Jun. 5, 2007.

(Continued)

*Primary Examiner* — Hyun Nam
(74) *Attorney, Agent, or Firm* — Baker Botts L.L.P.

(57) ABSTRACT

A system for identifying peripheral devices in an information handling system uses a path-based signature for each peripheral component device. A static table is included for listing the path of each peripheral device and is accessible to the Basic Input-Output System (BIOS). The BIOS is configured to identify peripheral components associated and determine a path-base device signature for each peripheral component.

17 Claims, 4 Drawing Sheets

OTHER PUBLICATIONS

Office Action from Singapore, Patent Application No. 200703950-6, 10 pages, Jun. 25, 2008.

Office Action from China, Patent Application No. 200710108949.3, 6 pages, Sep. 5, 2008.

Office Action from Great Britain, Patent Application No. 0710777.4, 2 pages, Nov. 5, 2008.

Response to Office Action for German Patent Application DE 10 2007 026 105.7; pp. 16, May 12, 2009.

* cited by examiner

FIG. 4

| DEVICE | Bus:Dev:Fun | PATH | 32-BIT UNIQUE SIGNATURE | STRING DISPLAYED BY APPLICATION SOFTWARE |
|---|---|---|---|---|
| SCSI CARD | 2:5:0 | 0-0/0-0/0-0/0-5/0 | 0x00010001 | slot.scsi.1: Adaptec 7890 controller |
| DUAL-FUNCTION NIC, Fn0 | 5:0:0 | 0-0/0-2/0-0/0 | 0x01040002 | slot.nic.4-1: Intel Pro 100 NIC |
| DUAL-FUNCTION NIC, Fn1 | 5:0:1 | 0-0/0-2/0-0/1 | 0x02040002 | slot.nic.4-2: Intel Pro 100 NIC |
| EMBEDDED NIC1 | 6:0:0 | 0-0/0-1c/0-0/0 | 0x00010102 | emb.nic.1: Broadcom NetExtreme Gigabit NIC |
| EMBEDDED NIC2 | 7:0:0 | 0-0/0-1c/1-0/0 | 0x00020102 | emb.nic.2: Broadcom NetExtreme Gigabit NIC |
| EMBEDDED RAID | 9:0:0 | 1-0/0-0/0 | 0x00000103 | emb.raid.1: LSI PERC/5i controller |

FIG. 5A

BIT  0 → 7 8 → 15 16 → 23 24 → 31

| ENUMERATION VALUE | EMBEDDED # | SLOT # | INSTANCE # |
|---|---|---|---|

FIG. 5B

| ENUMERATION VALUE | EMBEDDED # | SLOT # | INSTANCE # | DEVICE AUTHENTICATION |
|---|---|---|---|---|

METHOD AND SYSTEM FOR UNIQUELY IDENTIFYING PERIPHERAL COMPONENT DEVICES

TECHNICAL FIELD

The present invention is related to the field of computer systems and more specifically to a system and method for identifying peripheral component devices.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When booting a computer system in an information handling system, any one of several bootable devices may be utilized to boot the computer system. Certain bootable devices such as floppy disk drives or compact-disk read-only memory (CD-ROM) drives, can emulate or receive controls from a Basic Input-Output System (BIOS). Other example bootable devices, such as devices that rely on a peripheral component interconnect bus (PCI devices) may supply their own boot code. Often, a user may set a boot order for the available bootable devices that the computer will follow during a boot operation. Users expect the boot order to be followed consistently from one boot operation to the next.

Peripheral component devices may include devices compliant with the Peripheral Component Interconnect (PCI), Peripheral Component Interconnect Express (PCIE), and Peripheral Component Interconnect Extended (PCI-X). Typically, an information handling system identifies such peripheral components using a bus/device/function identification system ("bus/dev/fn") for identifying the location of a particular peripheral component. While the bus/dev/fn system can be useful, in the event that devices are added or removed from the information handling system from one boot to the next the bus/dev/fn identifier of a particular peripheral component device (or a corresponding device slot) may change. In the event that a bus/dev/fn identifier does change between boot operations, a number of problems arise. For example, if the order of bootable devices is specified within a BIOS based on the bus/dev/fn of each device and the system configuration changes, the listed bus/dev/fn identifier will no longer be correct and the bootable devices will not boot in accordance with the BIOS boot specification. Additionally if a configuration error or another run time error occurs, the information handling system may be unable to identify the device which has encountered an error.

Existing methods to uniquely identify PCI devices suffer from a primary disadvantage, namely that the unique signatures that are used are specific to a particular computing platform. Accordingly, the code used to generate such unique signatures must be rewritten for each new system.

SUMMARY OF THE INVENTION

Therefore a need has arisen for an improved system and method for identifying peripheral components in an information handling system.

A further need has arisen for a system and method of identifying peripheral components in an information handling system that consistently identifies peripheral components following the installation or removal of peripheral components therein.

A system and method for generating a path-based signature for peripheral component devices in an information disclosure system is described that alleviates the drawbacks and difficulties associated with prior systems and methods of identifying peripheral component devices within an information handling system.

In one aspect, an information handling system is disclosed that includes one or more processing resources, a first host bus in communication with the processing resource and multiple peripheral component devices in communication with the first host bus. The peripheral component devices each have a defined path with respect to the first host bus. The information handling system also includes a Basic Input-Output System (BIOS) and a static table that lists a path for each of the component devices. The BIOS is configured to identify each peripheral component device and provide a defined path-based device signature for each of the peripheral components.

In another aspect, a system for identifying peripheral components is disclosed that includes a Basic Input-Output System (BIOS), a static table, and a Peripheral Component Interconnect (PCI) bus enumerator. The static table is associated with the BIOS and lists path information and a defined device signature for each component device. The PCI bus enumerator is configured to identify peripheral components associated with each device slot and generate a path-based component signature for identifying each of the respective peripheral components.

In yet another aspect a method for identifying peripheral components includes generating a static table listing multiple peripheral component device's unique signatures and their corresponding paths. The method also includes identifying one or more components associated with the peripheral component device slots and generating a component signature able to identify each respective peripheral component and incorporate a path-based identifier.

The present disclosure includes a number of important technical advantages. One important technical advantage is the provision of a static table listing a path for each of a plurality of peripheral component devices within an information handling system. The path-based identifier provides a stable identifier that does not change when peripheral components are added or removed in the system or additional host buses are added and removed from the system. Additional advantages will be apparent to those of skill in the art from the FIGURES, description and claims provided herein.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein:

FIG. 4 is a signature table according to teachings of the present disclosure; and FIGS. 5A and 5B show signature fields for identifying peripheral components according to teachings of the present disclosure.

DETAILED DESCRIPTION OF THE INVENTION

Preferred embodiments of the invention and its advantages are best understood by reference to FIGS. 1-5 wherein like numbers refer to like and corresponding parts and like element names to like and corresponding elements.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
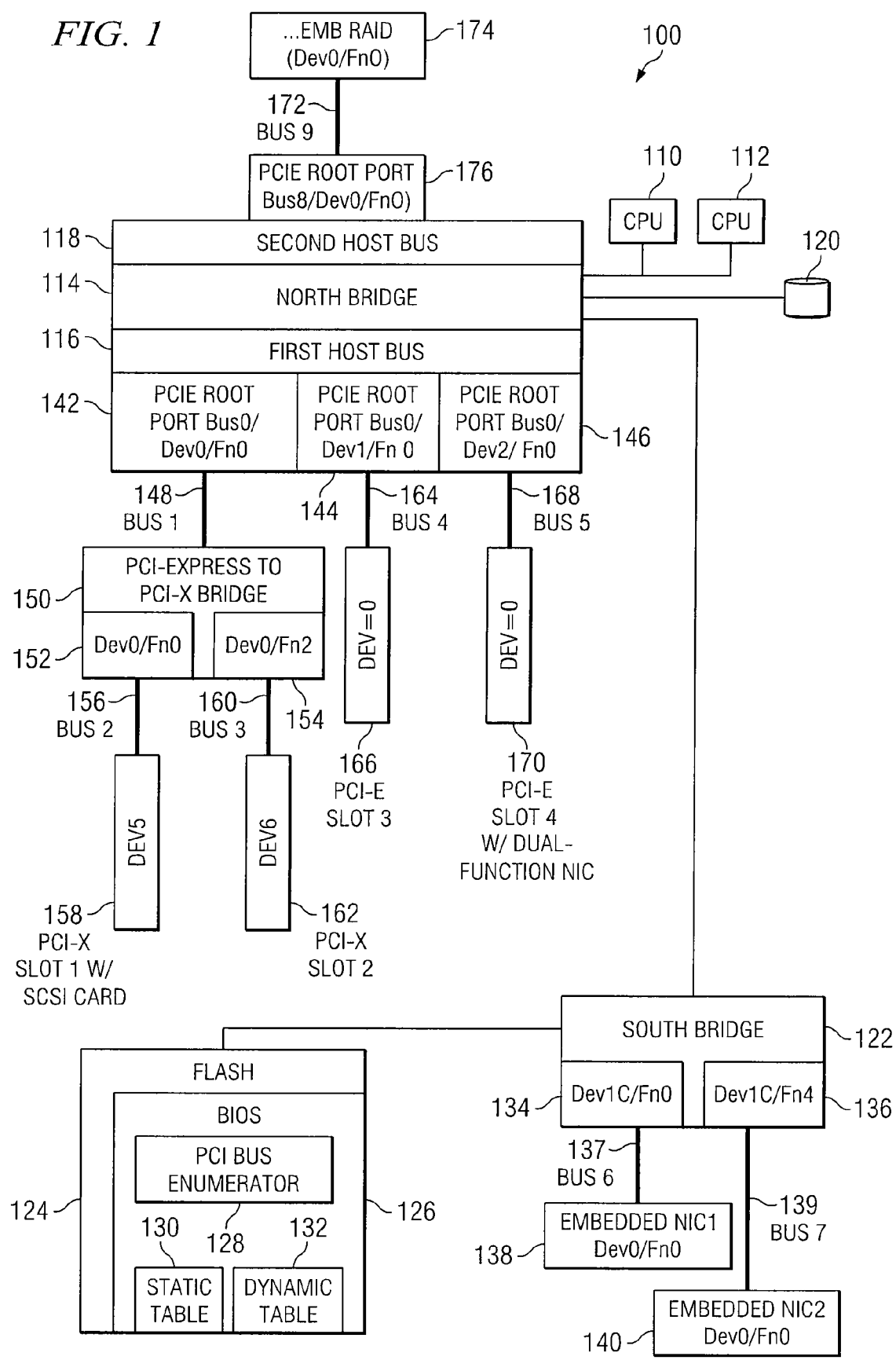
FIG. 1 shows an information handling system according to teachings of the present disclosure.

Now referring to FIG. 1, an information handling system, indicated generally at 100, is shown. Information handling system 100 includes first Central Processing Unit (CPU) 110 and second CPU 112. CPUs 110 and 112 are in communication with north bridge 114. North bridge 114 is in communication with first host bus 116 and second host bus 118.

First Host bus 116 is in communication with PCIE root ports 142, 144 and 146. PCI root port 142 has a bus/dev/fn number of bus0/dev0/fn0. PCIE root port 144 has a bus/dev/fn number of bus0/dev1/fn0. Additionally PCIE root port 146 has a bus/dev/fn number of bus0/dev2/fn0.

PCIE root port 142 is in communication with PCIE to PCI-X bridge 150 via connection 148. Connection 148 is designated as bus 1. PCIE to PCI-X bridge 150 includes ports 152 and 154. Port 152 has a dev/fn number of dev0/fn0 and port 154 has a dev/fn number of dev0/fn2. Port 152 is in communication with a peripheral component device 158 via connection 156 which is designated as bus 2. Port 154 is in communication with peripheral component device 162 via connection 160 which is designated as bus 3.

PCIE root port 144 is in communication with peripheral component device 166 via connection 164 which is designated as bus 4. PCI root port 146 is in communication with PCIE slot 170 via connection 168. Connection 168 is designated as bus 5. In the present embodiment PCIE slot 170 contains a dual function Network Interface Card (NIC).

In the present embodiment, device slot 158 is provided for connection with a SCSI card and peripheral component device 162 is provided for a PCI-X component. Slot 158 has a device value of 5; slot 162 is defined with a device value of 6. In the present embodiment slot 166 may be PCIE slot.

North bridge 114 is also in communication with south bridge 122. South bridge 122 includes ports 134 and 136. Port 134 has a dev/fn number of dev1C/fn0 and port 136 has a dev/fn number of dev1C/fn4. Port 134 is in communication with embedded NIC 138 which has a dev/fn number of dev0/fn0. Embedded NIC 138 is in communication with port 134 via connection 137 which is designated as bus 6. Port 136 is in communication with second embedded NIC 140 via connection 139 which is designated as bus 7. Embedded NIC 138 has a dev/fn number of dev0/fn0 and second embedded NIC 2 has a dev/fn number of dev0/fn0. Connection 139 is designated as bus 7 in the present embodiment.

Flash memory resource 124 is in communication with south bridge 122. Flash 124 includes Basic Input-Output System (BIOS) 126. BIOS 126 includes PCI bus enumerator 128, static table 130 and dynamic table 132.

System memory 120 is in communication with north bridge 114. Second host bus 118 is in communication with north bridge 114. PCIE root port 176 is in communication with second host bus 118. Root port 176 is designated as bus 8 in the present embodiment. PCI root port 176 is further in communication with embedded RAID 174 via connection 172. PCIE root port 176 has a bus/dev/fn number of bus8/dev0/fn0. Embedded RAID 174 has a dev/fn number of dev0/fn0. Connection 172 is designated as bus 9 in the present embodiment.

BIOS 126 is a Basic Input-Output System well known to those of skill in the art. Static table 130 is associated with the BIOS and includes a listing of paths and the corresponding device signature for each of the plurality of peripheral component devices. As discussed herein, the device signatures may also be referred to as a "path-based device signature", a "path-based unique signature" or as a "unique signature" and may refer to any suitable identifier that is based on path information as well as other component identification data. As used herein, the term "unique" should be interpreted as unique within a given system and not globally unique.

Each device signature is preferably a pre-defined value. In one embodiment the static table has two main values, the path for each device and the pre-defined device signature. When the system 100 is booted, BIOS 126 keeps tracks of the path of each device it finds. It then looks up the path in the static table. It then takes the corresponding device signature from the static table. In this manner BIOS 126 may use static table 130 as a translation table to go from the path of the device to its device signature.

Each path lists the device/function number of every bridge from the root bridge to the endpoint of the device and the PCI device/function number of the endpoint itself. For example, in the present embodiment static table 130 includes paths for slots 158, 162, 166, 170, 138 and 140 as discussed below. As discussed herein a device signature is not a typical bus/device/function number. Instead the device signature may include, for instance, the instance number of each device, the slot number of each device, the embedded number of each device and the enumeration value for each device. This path-based identification system is advantageous because it will not change if the configuration of the system should happen to change. This is a distinct advantage to use of bus/function/device addressing which will change if a configuration of the system occurs. Another advantage of the present system is the translation of the path to a device signature that is the same on every system. For instance, the device signature for a given slot is the same on every system even though the paths may be different. Another notable aspect about the device signature is that it provides valuable information that other software applications may utilized. For example, by parsing the fields in the device signature, any software application can determine the type of device, its slot number, etc.

Figure 2A:
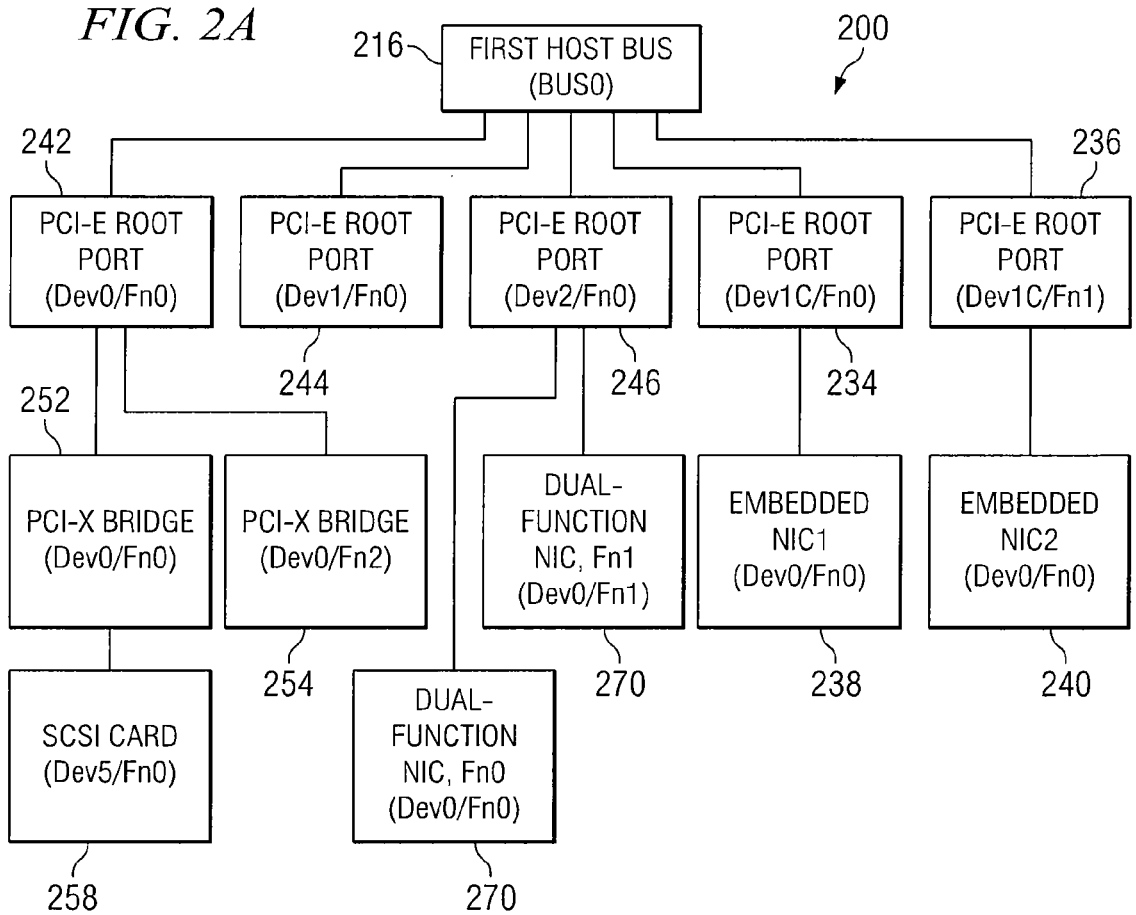
FIGS. 2A and 2B are device tree representations of the information handling system of FIG. 1.

Now referring to FIG. 2A a device tree corresponding to the first host bus and associated components of FIG. 1. First host bus 216 (bus 0) is in communication with port 242 (dev0/fn0), port 244 (dev1/fn0), port 246 (dev2/fn0), port 234 (dev1C/fn0) and port 236 (dev1C/fn1). Port 242 is in communication with PCI-X bridge 252 (dev0/fn0) and PCI-X bridge 254 (dev0/fn2). PCI-X bridge 252 is further in communication with SCSI card 258 (dev5/fn0).

Port 246 is in communication with dual function NIC devices 270 (dev0/fn0 and dev0/fn1). Port 234 is in communication with first embedded NIC 238 (dev0/fn0) and port 236 is in communication with second embedded NIC 240 (dev0/fn0).

Accordingly, in the present embodiment SCSI card 158 has a path of 0-0/0-0/0-0/0-5/0. Dual function NIC 170 has the paths: 0-0/0-2/0-0/0 (for the first function) and 0-0/0-2/0-0/1 (for the second function). First embedded NIC 138 has a path: 0-0/0-1c/0-0/0. Second embedded NIC 140 has the 0-0/0-1c/1-0/0. Embedded RAID 174 has a path: 1-0/0-0/0. As discussed above, the first number is the appropriate host bus number followed by the series of device/function numbers along each respective path.

Figure 2B:
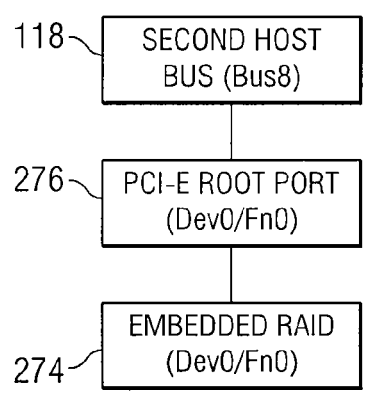

Now referring to FIG. 2B a device function tree for second host bus 118. The tree includes a second host bus 118 (bus 8) in communication with PCIE root port 276 (dev0/fn0). Port 276 is in communication with embedded RAID device 274, (dev0/fn0).

Figure 3:
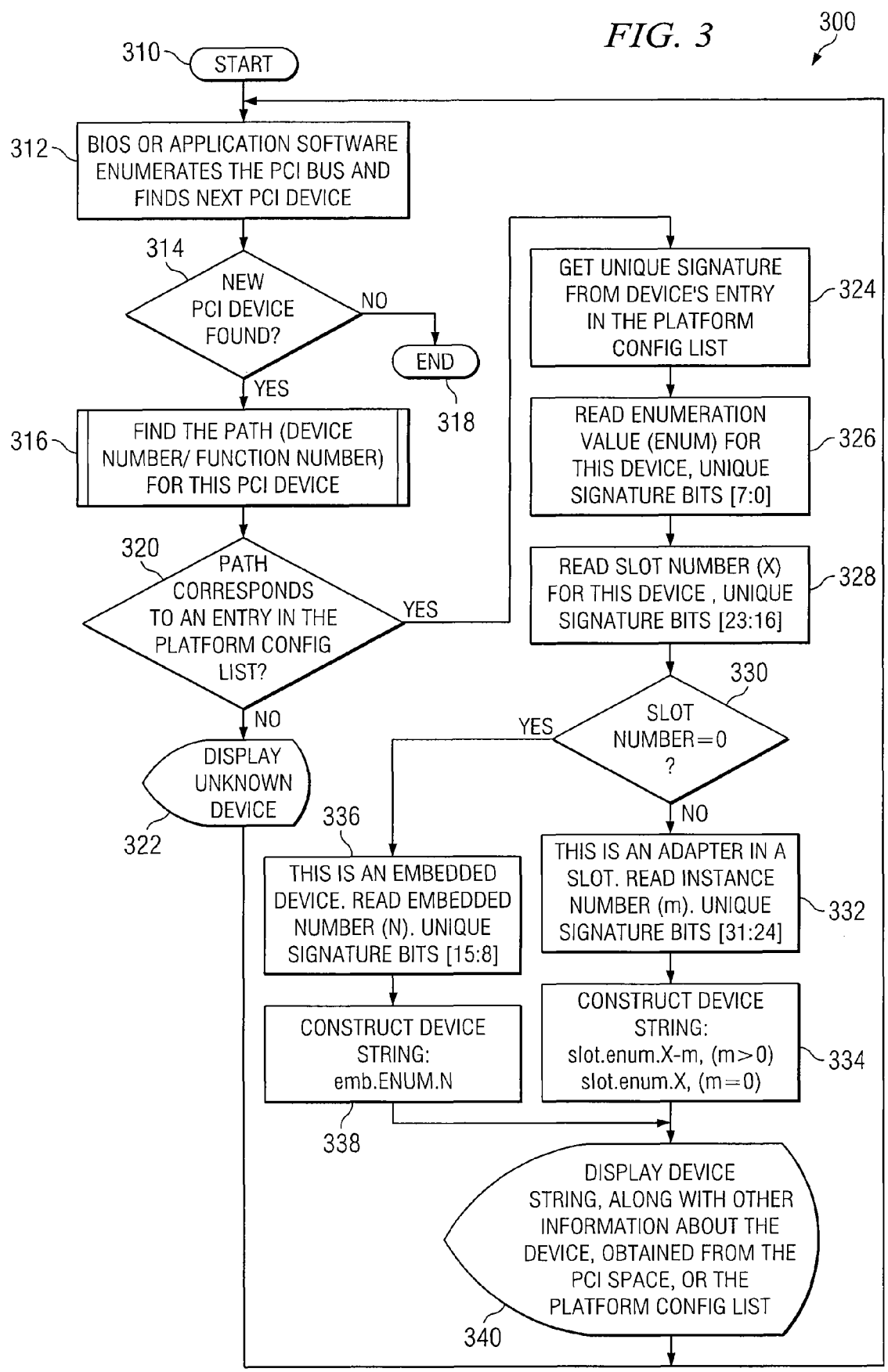
FIG. 3 is a flow diagram of a method for identifying peripheral components according to teachings of the present disclosure.

Now referring to FIG. 3, a flow diagram of a method for identifying peripheral components according to the present disclosure is indicated generally at 300 is shown. Method 300 begins at 310 by first having a BIOS or other appropriate software application enumerate the PCI bus and find a PCI device 312. This may occur, for example, during a power-on self-test (POST) operation. Next, it is determined whether a new PCI device is found 314. If no new PCI device is found the method ends 318. If a new PCI device is found, the method proceeds to step 316 in which a path for the device (including the device number and function number for each PCI device is determined).

Next, the method includes determining whether the path corresponds to an entry in a static table (which may also be referred to herein as a platform configuration list) 320. In the event that the path does not correspond to an entry in the platform configuration list an unknown device message is displayed 322. The method then returns to step 312.

If the path corresponds to a listing in the static table the method proceeds to step 324. In step 324, a device signature for the device is obtained from the static table 324 and an enumeration value (ENUM) is read for the device 326. In one particular embodiment, the ENUM may be found in bits 7-0 of the device signature.

Next, the slot number for the device is read 328. In one particular embodiment, the slot number may be found in bits 23-16 of the device signature.

After the slot number is read it is determined whether or not the slot number is equal to zero 330. If the slot number is equal to zero, the method proceeds to step 336. If the slot number is not equal to zero the method proceeds to step 332.

In step 336, the device is determined to be an embedded device and the embedded number of the device is read and filled within the appropriate bit of the device signature. In one embodiment this may include reading bits 15-8 of the device signature. Next, a device string is constructed 338. In the present embodiment the device string provides an example showing how a software application may use the device signature to generate a and display a descriptive string about the device to the user.

In the event that the slot number is not equal to zero, at step 332 it is determined that the device is an adapter within a slot and the instance number of the adapter is read and inserted within the device signature 332. In one embodiment, the instance number may be read from bits 31-24. The device string is then constructed 334.

Following steps 334 or 338 the method proceeds to display the device string along with other information about the device obtained from the PCI space or the platform configuration list (static table) 340.

Now referring to FIG. 4, a table is generally indicated at 400 listing non device signature information according to the embodiment shown in FIG. 1. Table 400 includes device column 410 listing different peripheral component devices within information handling system. Column 412 is the bus device function number of each device and column 414 is the path signature for each device. Column 416 is the 32-bit device signature corresponding to the path value 414. In one embodiment the device signature 416 may preferably be parsed by software. Since each of the fields is pre-defined, the software may display information about the device (such as what type of device it is and it's slot number). In other embodiments, a system could not display the slot number of a PCI device because, for instance, slot 1 would be different on every system. The present system and method utilizes the slot number for each device in within device signature 416, such that the software determining a slot for a given device may be independent of any particular platform.

Column 418 includes a string used to identify the device which may be displayed by application software. Table 400 generally includes a listing of devices 420.

As discussed herein, FIGS. 3 and 4 provide examples of how a software application may use device signature 416 to generate a descriptive string for each of devices 420.

Now referring to FIG. 5A, a format for a 32-bit device signature for a peripheral component is shown. The 32-bit signature 500 includes a first field 510 for listing an enumeration value. In the present embodiment enumeration value field 500 is an 8-bit field stored within bits 0-7. Embedded number field 512 is used to store the embedded number of the device and is located in bits 8-15. In one particular embodiment if there is more than one occurrence of a given embedded device (such as dual function NICs 270) the bit field may preferably be incremented for each occurrence: 1 for a first instance, 2 for a second instance, etc. Slots may be listed as 0.

Field 514 is the slot number field which encompasses bits 16-23 and lists the slot number of the device. In a preferred embodiment 0 may be used for embedded devices in this field. Next an instance number field 516 is included in bits 24-31. If more than one device and/or function is provided in a given slot, the bit field may be incremented for each instance. This field may be listed as 0 for embedded devices.

Now referring to FIG. 5B, an alternative device signature field 520 is disclosed that includes enumeration value 522, embedded number 524, slot number 526, instance number 528 and a device signature 530. Fields 522, 524, 526 and 528 are analogous to those disclosed with respect to FIG. 5A although each may incorporate any suitable bit range. Device authentication field 530 may include a serial number, MAC address or other identifier associated with a particular peripheral component. In this manner in the event that a peripheral component is exchanged for a new peripheral component of the same type, the system may keep track of the specific identity of each peripheral component.

Although the disclosed embodiments have been described in detail, it should be understood that various changes, substitutions and alterations can be made to the embodiments without departing from their spirit and scope.

What is claimed is:

1. An information handling system comprising:
   at least one processing resource;
   a first host bus in communication with the processing resource;
   a plurality of peripheral component devices in communication with the first host bus,
   the peripheral component devices having a defined path with respect to the first host bus;
   a Basic Input-Output System (BIOS) in communication with the first host bus;
   a static table accessed by the BIOS, the static table listing a path for each of the plurality of peripheral component devices and a corresponding path-based device signature for each peripheral component device;
   wherein the path-based device signature comprises an enumeration value field, an embedded device number field, a slot number field, and an instance number field that corresponds to the peripheral component device and a function; and
   the BIOS configured to identify a path of a peripheral component device and determine the corresponding path-based device signature for identifying the peripheral component.

2. The information handling system of claim 1 further comprising:
   a dynamic table accessed by the BIOS; and
   the BIOS configured to store the path-based device signatures within the dynamic table.

3. The information handling system of claim 1 wherein the plurality of peripheral component devices are each configured to support a device compliant with one or more of the group consisting of a Peripheral Component Interconnect (PCI), Peripheral Component Interconnect Express (PCIE) and Peripheral Component Interconnect Extended (PCI-X).

4. The information handling system of claim 1 wherein the BIOS further comprises a PCI enumerator module configured to identify the peripheral component devices present in the information handling system.

5. The information handling system of claim 1 further comprising a flash memory resource in communication with the first host bus, the BIOS stored within the flash memory resource.

6. The information handling system of claim 1 further comprising a memory resource in communication with the host bus, the static table stored in the memory resource.

7. The information handling system of claim 1 wherein the BIOS is configured to identify the peripheral component device during a Power-On Self-Test (POST) operation.

8. The information handling system of claim 1 further comprising a second host bus in communication with the first host bus.

9. The information handling system of claim 1 wherein the path-based device signature further comprises a device authentication field.

10. The information handling system of claim 1 wherein the path-based device signature comprises a 32 bit data field.

11. A system for identifying peripheral components comprising:
    a Basic Input-Output System (BIOS);
    a static table accessed by the BIOS, the static table listing a plurality of peripheral component devices in an information handling system, a path identification corresponding to each peripheral component device, and a corresponding path-based device signature for each peripheral component device;
    wherein the path-based device signature comprises an enumeration value field,
    an embedded device number field, a slot number field and an instance number field that corresponds to each peripheral component device and a function; and
    a Peripheral Component Interconnect (PCI) bus enumerator in communication with the BIOS and configured to identify a peripheral component coupled with one or more of the peripheral component device slots and determine the corresponding path-based device signature for each peripheral component device for identifying the respective peripheral component device.

12. The system of claim 11 further comprising:
    a dynamic table accessed by the BIOS; and
    the BIOS configured to store the path-based device signatures within the dynamic table.

13. The system of claim 11 wherein the PCI bus enumerator is configured to identify a peripheral component device and determine the path-based device signature during a Power-On Self-Test (POST) operation.

14. The system of claim 11 wherein the PCI bus enumerator is configured to identify at least one peripheral component configured according to one of the group consisting of a Peripheral Component Interconnect (PCI), Peripheral Component Interconnect Express (PCIE) and Peripheral Component Interconnect Extended (PCI-X).

15. A method for identifying peripheral components comprising:
    generating a static table accessed by a Basic Input-Output System (BIOS) listing a plurality of peripheral component devices and corresponding paths and a path-based device signature corresponding to each peripheral component device;
    identifying one or more peripheral component devices by a Peripheral Component Interconnect (PCI) bus enumerator in communication with the BIOS;
    determining a path-based device signature for each peripheral component device incorporating the path and operable to identify each respective peripheral component; and
    wherein the path-based device signature comprises an enumeration value field, an embedded device number field, a slot number field and an instance number field that corresponds to the one or more peripheral component devices and a function.

16. The method of claim 15 comprising identifying one or more peripheral component devices and determining the path-based device signature during a Power-On Self-Test (POST) operation.

17. The method of claim 15 further comprising storing the path-based device signature in a dynamic table.

* * * * *